Oct. 30, 1951        H. GANG        2,572,921

OPERATION CONTROL MEANS

Filed Feb. 11, 1949        5 Sheets-Sheet 1

Inventor
HERMAN GANG
By George V. Hall
Attorney

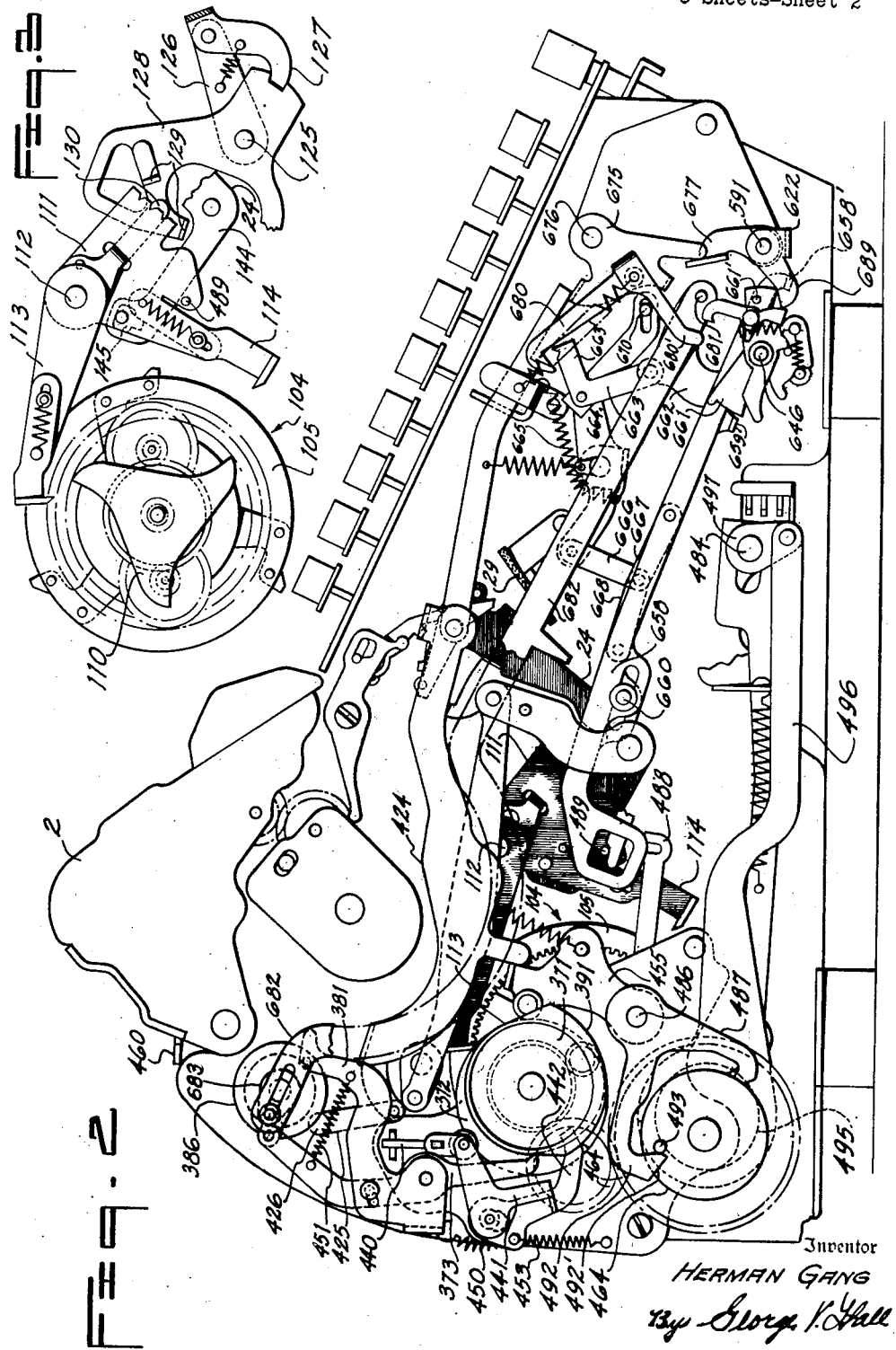

Oct. 30, 1951 — H. GANG — 2,572,921
OPERATION CONTROL MEANS
Filed Feb. 11, 1949 — 5 Sheets-Sheet 3
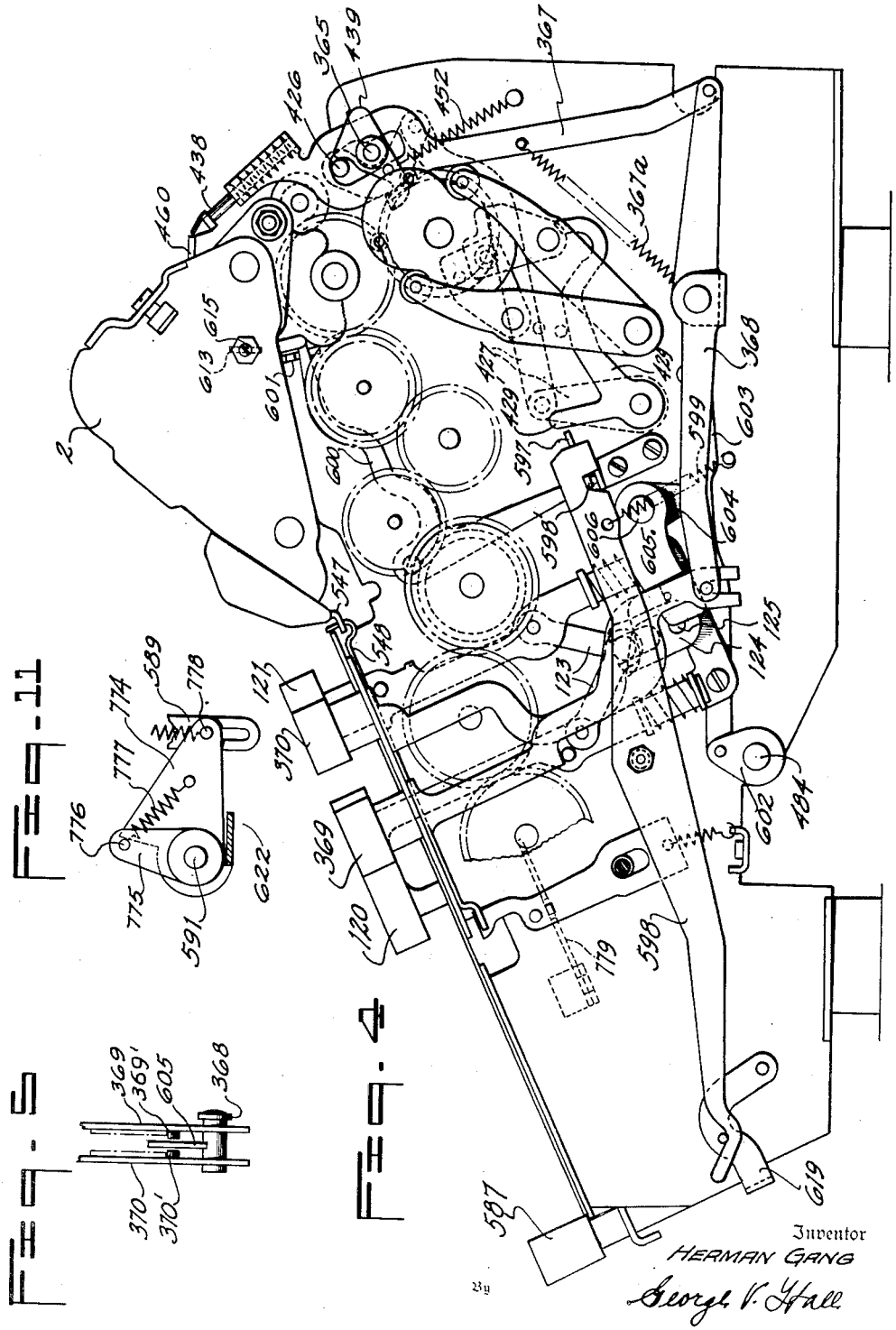
Inventor
HERMAN GANG
By George V. Hall
Attorney

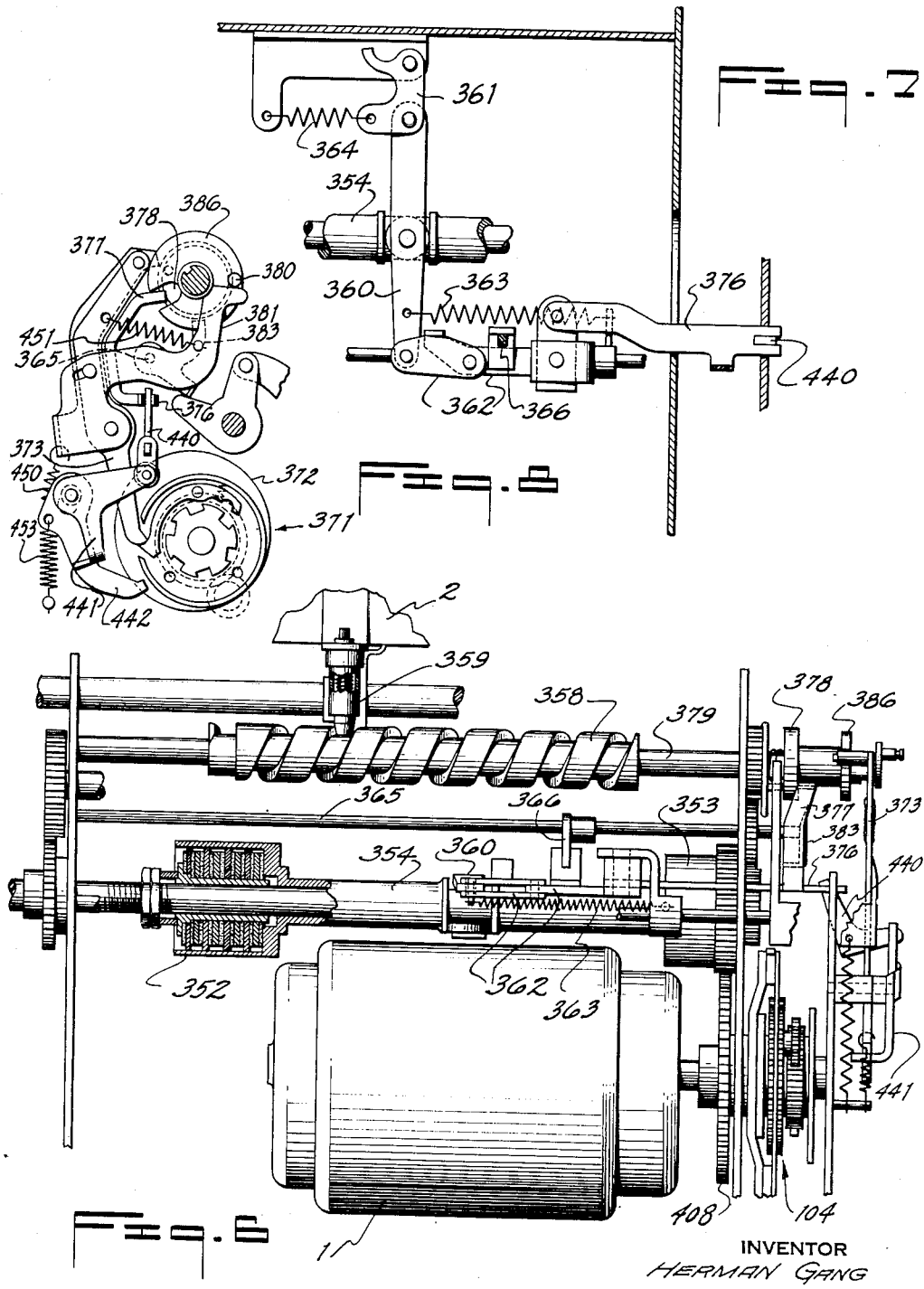

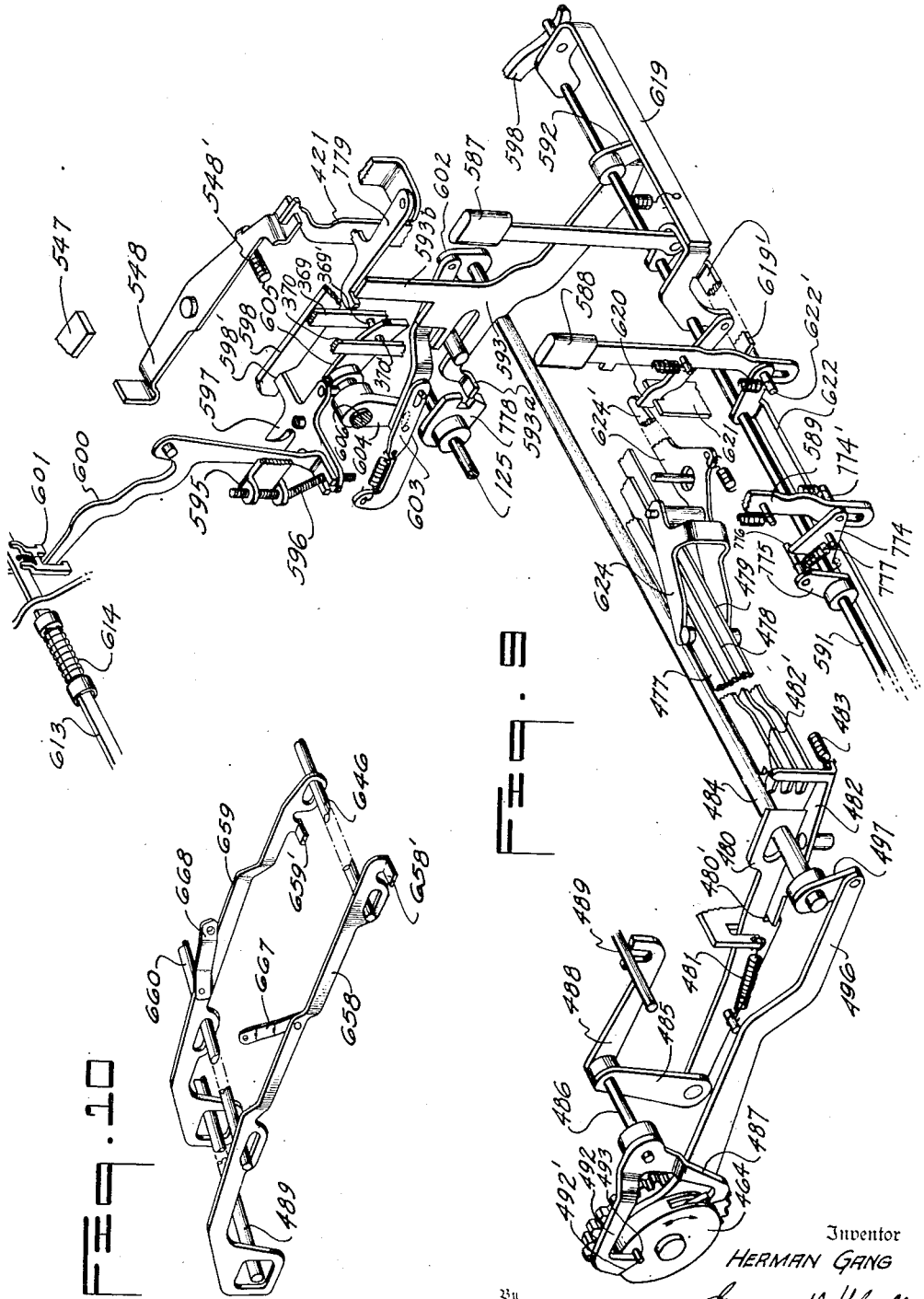

Patented Oct. 30, 1951

2,572,921

UNITED STATES PATENT OFFICE 2,572,921

OPERATION CONTROL MEANS

Herman Gang, Livingston, N. J., assignor to Monroe Calculating Machine Company, Orange, N. J., a corporation of Delaware Application February 11, 1949, Serial No. 75,956

12 Claims. (Cl. 235—63)

The invention relates to operation control means for calculating machines and the like and particularly to an improved arrangement wherein the position of a shiftable register carriage determines the program of clutch driven operations performed in response to the manipulation of an operating member such as a key.

According to the disclosure as set forth in my copending application Serial No. 8,548 (now Patent 2,531,207), a program of multiplication preceded by a clearout operation for the product register and the counting dials may be instituted in response to the depression of an initiating key only when the register carriage is in its leftmost position; suitable interlocks preventing depression of the initiating key when the carriage is displaced therefrom. The present disclosure provides that the initiating key may be depressed when the carriage is displaced from its leftmost position to initiate the clearout operation while the multiplying mechanism is latched against operation. The drive means for the clearout operation is adapted to institute a leftward carriage shift which is terminated in the leftmost position, in which position the initiating key may be redepressed to institute the program of multiplication.

A further utility of the invention will appear with reference to my copending application, Serial No. 57,943 (now Patent 2,531,208). As disclosed in said application, the machine may be adapted to transfer a value from the product register to a series of multiplier storage devices only when the register carriage is displaced from its leftmost position; the transfer being effected upon depression of a clear key for said register. Furthermore, the conjoint depression of the clear key and a second key will institute an automatic leftward carriage shift following the transfer operation. The present disclosure provides that this operation may be performed in response to the single depression of the aforesaid initiating key and if the key is held depressed until the shift is terminated in the leftmost position, a program of multiplication will then be initiated.

It will be understood however that the clearout, transfer and multiplying operations constitute no part of the present invention and that the invention resides in the institution of the clutch driven operations in conjunction with carriage position devices. It will be apparent therefore that the invention is equally applicable to the control of other clutch driven operations in other machines wherein it is desirable or necessary to position a shiftable carriage in a given position prior to the initiation of the particular operation. The invention, however, will best be understood from the following description when read in conjunction with the accompanying drawings wherein:

Fig. 2 is a left side elevation of the machine showing the differential clutch engaging mechanism, the clear out clutch and portions of the carriage shift control mechanism;

Fig. 3 is a detailed view of the differential clutch mechanism;

Fig. 4 is a right side elevation of the machine showing the carriage shift keys and mechanisms associated therewith;

Fig. 5 is a fragmentary view of the carriage shift keys looking from the left in Fig. 4;

Fig. 6 is an elevation and partial section of portions of the carriage shift and actuator drive control mechanism as viewed from the rear of the machine;

Fig. 7 is a detailed plan view of certain of the control devices shown in Fig. 6;

Fig. 8 is a detailed left side elevation of the plural phase clutch associated with certain of the carriage shift and actuator control devices;

Fig. 9 is a perspective view with several of the parts in exploded relationship showing the carriage shift initiating means, interlock devices and the spring coupling device between the operating key and the control mechanism;

Fig. 10 is an exploded perspective view of the differential clutch engaging slides and Fig. 11 is a detailed side elevation of the spring coupling device.

Differential clutch mechanism

Figure 1:
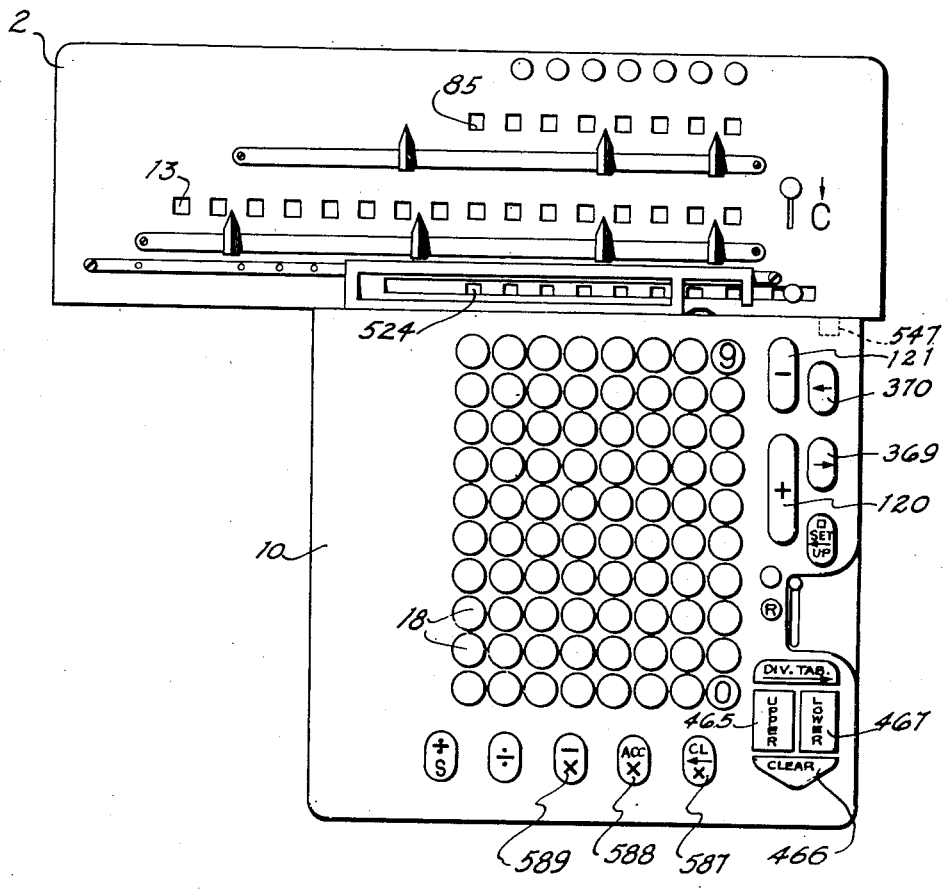
Fig. 1 is a plan view of a calculating machine embodying the invention.

The invention is shown as applied to a machine constructed substantially as fully disclosed in my aforenoted copending application Serial No. 8,548 (now Patent 2,531,207), in which power from the motor 1 (Fig. 6) to perform the registering and carriage shifting operations involved in a program of multiplication is transmitted through a common differential clutch mechanism 104 (Figs. 2, 3 and 6). The registering mechanism is connected to the differential clutch mechanism by a normally engaged first auxiliary clutch 352 (Fig. 6) and alternatively the carriage shifting mechanism is connected by engagement of a normally disengaged second auxiliary clutch 353 which is engaged upon disengagement of the first auxiliary clutch.

The differential clutch mechanism is constructed substantially in accordance with the disclosure of United States Patent No. 1,566,650, issued on December 22, 1925, to George C. Chase. Normally the gearing comprising both working legs of the differential drive rotate idly as described in the aforenoted patent; interruption of the movement of one leg causing the planet gears to move in their orbit in one direction accordingly rotating the output gear 408 (Fig. 6) and interruption of the movement of the other leg causing a movement in the opposite direction. The working legs of the differential drive are selectively arrested by means of a reversing clutch lever 111 (Figs. 2 and 3) fulcrumed on the frame at 112, and adapted for neutral, additive and subtractive setting. The two active settings provide for additive and subtractive registration or alternatively for right and left carriage shift respectively. Clockwise movement of lever 111 positions it to additive setting whereby a hook arm 114 of said lever will engage a lug on gear 105 forming one leg of the differential drive to interrupt the movement thereby causing rotation of the output gear 408. Conversely, counterclockwise movement positions the lever 111 to subtractive setting whereby a hook arm 113 thereof will engage a stop 110 of the other leg of the differential to interrupt its movement and cause rotation of the output gear 408 in the reverse direction.

*Carriage shifting mechanism*

The carriage shifting devices are constructed in accordance with the disclosure of United States Patent 2,419,760, issued to Edwin F. Britten, Jr., on April 29, 1947, as modified by the disclosure of the aforenoted patent application Serial No. 8,548 (now Patent 2,531,207).

The selectively engageable differential clutch mechanism 104 which as heretofore described determines the sign of registration is alternatively engageable to determine the direction of shift of the register carriage 2 (Figs. 1, 2, 4 and 6). This differential clutch mechanism is engaged under control of registration and shifting motor operation keys, and a coupling is provided in the train between said keys and the clutch mechanism to provide for stopping of the operation while a key is held manually depressed. Plus and minus bars 120, 121 (Figs. 1 and 4) are depressible to alternatively determine the engagement of the differential clutch mechanism with power from the motor 1 to effect the registering operations, the drive for which is transmitted through the normally engaged auxiliary clutch 352. Associated with the plus and minus keys are the right and left shift control members comprising keys 369 and 370 respectively. The stems of the right and left shift keys are provided with shoulders (Fig. 4) which overlie pins in the stems of the plus and minus keys respectively, whereby the depression of a shift key results in the depression of the associated registration key to selectively engage the differential clutch mechanism. Furthermore in response to the depression of a shift key the auxiliary clutch 352 (Fig. 6) is disengaged and the auxiliary clutch 353 engaged to complete the drive to the shift worm 358.

The plus bar 120 and minus bar 121 are connected by links 123 with an arm 124 fast upon a rock shaft 125, this shaft extending across the machine and being provided at its left hand end with an arm 126 (Fig. 3) having coupling connection 127 with a setting plate 128. Setting plate 128 is provided with opposed lugs 129 lying upon either side of a tooth 130 of clutch lever 111 so that depression of one of the bars 120, 121 will rock shaft 125 and through plate 128 will move clutch lever 111 from neutral position to engage the arm 113 or 114 with the related elements of the differential clutch mechanism. Clutch lever 111 is held in neutral or either of its active positions by a suitable click pawl (not shown).

The driving members of the auxiliary clutches 352 and 353 (Fig. 6) connected by the sleeve 354 are movable laterally to compress the friction disks of the normally engaged clutch 352 or the clutch 353 respectively. The driven element of clutch 353 is fast with a gear having intermediate gear connection with a gear fast upon a worm shaft 379. Carriage shifting worm 358 is also fast on shaft 379, this worm being engaged by spring urged plunger 359 mounted on carriage 2. Normally, clutch 352 is held in engagement by a toggle linkage 362 (Fig. 7) this linkage being pivotally connected to one end of a lever 360, said lever being connected at its other end to the frame of the machine through a link 361, and being provided with anti-friction rollers engaging flanges of the sleeve 354. A spring 364 attached to the linkage 361 holds the clutch 352 engaged under spring tension. Upon breaking of the toggle 362 a spring 363 attached to lever 360 will shift the sleeve 354 toward the left of the machine (toward the right in Figs. 6 and 7) disengaging the clutch 352 and engaging the auxiliary shift clutch 352. Toggle 362 is broken upon depression of a shift key as follows:

An intermediately pivoted lever 368 (Figs. 4 and 5) engaged at its forward end by the stems of the shift keys 369, 370 is pivotally connected at its rear end with an arm 367 which is guided at its upper end by slot engagement with a shaft 365. A shoulder of arm 367 underlies a laterally bent lug of a lever 439 fast upon shaft 365, said shaft having also fast thereupon a finger 366 (Figs. 6 and 7) engaging a lug of one of the links of toggle 362. Therefore, depression of one or the other of the shift keys will rock lever 368 and shaft 365, and finger 366 will break the toggle 362. The auxiliary clutch 352 will accordingly be disengaged and the auxiliary shift clutch 353 engaged as the differential clutch mechanism 104 is selectively engaged to determine the direction of carriage shift.

Certain other controls are necessary in effecting the shifting operation, since the carriage shifting worm 358 must be freed from a normal location means when the operation is initiated, and at the end of the operation provision must be made for disengaging the differential clutch and the toggle 362 must be restored to its normal position.

To effect these operations a two phase shift control clutch 371 (Figs. 2 and 8) is provided said clutch being engaged for a partial operation upon breaking of toggle 362 and being again engaged to complete its cycle of movement upon termination of the shift. The driving element of the clutch has direct gearing connection with the motor 1, and the clutch pawl mounted upon the driven element of the clutch is normally held out of engagement with the driving element, against the bias of its spring by detent 442 engaging the pawl through a cut-away portion of the clutch housing.

When toggle 362 is broken to initiate a shift, a link 376 connected to a crank extension of one of the toggle links 362 will be moved to the right from the posiiton shown in Figs. 6 and 7, thereby rocking a pair of bell crank levers 440, 441. Bell crank lever 441 engages the detent 442 and the movement of said bell crank will move said detent away from the clutch pawl against the tension of spring 453, thus permitting engagement of the clutch 371. An intermediately pivoted detent 373 normally rests at its lower end against the housing of clutch 371, and is provided at its upper end with an anti-friction roller normally engaging a notch of a disk 386 as shown in Fig. 2. Disk 386 is splined upon the worm shaft 379, and the engagement of the anti-friction roller of detent 373 in the notch of said disk will prevent rotation of the shifting worm 358 and will consequently hold register carriage 2 in laterally adjusted position. Upon partial rotation of clutch 371, detent 373 will be forced through the aperture of the clutch housing by a spring 450 attached to a tripping arm 381 having pin and slot connection with said detent. This movement of detent 373 will effect release of clutch 371 and will remove the anti-friction roller from the notch of disk 386, freeing worm 358 to effect lateral movement of carriage 2; this position of the parts being illustrated in Fig. 8.

The carriage will be continuously shifted until the depressed shift key 369 or 370 is released by the operator or until the carriage has been shifted into one or the other of its extreme positions. Upon release of the shift key 369 or 370, spring 452 (Fig. 4) will rock shaft 365 to provide for reengagement of clutch 371 as follows: Disk 386 is connected by a sleeve with a second disk 378, normally held toward the left as viewed in Fig. 6 against the bias of a spring by an arm 377 of link 376. Upon breaking of the toggle 362, arm 377 will be moved to the right, but disk 378 will now be engaged by an arm 383 fixed upon shaft 365, so that the disks 378 and 386 will remain held in the position illustrated in Fig. 6 until shaft 365 is rocked upon release of the shift key. When shaft 365 is rocked thereby moving arm 383 to disengaged position, these disks will move to the right and a pin 380 (Fig. 8) fixed in the disk 386 will be brought into the plane of a cam extension of tripping arm 381. As the carriage 2 is shifted into its new position by worm 358, pin 380 will contact with tripping arm 381, putting detent 373 under the tension of a spring 451 connecting the detent and tripping arm. Therefore as the parts arrive at full cycle position, the anti-friction roller of the detent 373 will be moved into the notch of disk 386 thus rocking said detent to allow reengagement of clutch 371.

The final phase of operation of clutch 371 is adapted to effect disengagement of the clutch mechanism 104, the resetting of toggle 362 and to perform certain normalizing functions in connection with the control devices hereinafter described. The disengagement of the clutch mechanism is effected by reciprocation of stop arm 24 (Fig. 2). For this purpose, a cam 372 fast with the driven element of clutch 371 has engagement with an anti-friction roller mounted on a follower 455, said follower in turn having engagement with a shoulder of a link 424 which has connection at its forward end with arm 24. The rearward end of link 424 is attached to the lower end of a depending crank 425 fast on shaft 426 which extends across the machine (Fig. 4). Therefore, during the final operation of clutch 371, arm 24 will be reciprocated and the cam slot 145 (Fig. 3) at the rearward end of the extension 144 thereof will contact pin 146 thereby moving clutch lever 111 to its neutral position. Furthermore, upon reciprocation of arm 24 shaft 426 will be rocked in counterclockwise direction and return by link 424 and arm 425. Shaft 426 has link connection 427 (as shown in dotted lines in Fig. 4) with an arm 429 which is pivotally mounted on the right hand framing of the machine. When shaft 426 is rocked, arm 429 will accordingly be rocked in counterclockwise direction to effect the normalization of the control devices to be described.

The toggle 362 will be reset during the final operation of clutch 371 by means of a cam 391 (Fig. 2) fast on the driven element of said clutch. Cam 391 engages an anti-friction roller mounted on the bell crank lever 441 whereby bell crank lever 440, link 376 and toggle links 362 will be positively returned to normal position and thereby allow detent 442 to be spring urged to engage the clutch pawl of clutch 371 and disengage said clutch.

Should the right shift key 369 or left shift key 370 be held depressed until the carriage is shifted into either of its extreme positions, shift initiation shaft 365 will be restored to normal whereby the drive is terminated in the same manner as described when shaft 365 is restored to normal by release of a shift key. For this purpose, two lugs 460 (Figs. 2 and 4) are located on the rear of the carriage and so spaced that the nose of plunger 438 mounted on arm 367 is positioned just below one or the other of said lugs when the carriage is in either of its extreme positions. Should the carriage be in the extreme right-hand position, for example, and the left shift key 370 depressed, the plunger which is spring urged to its normal position will be depressed by contact with the leftmost lug 460 when arm 367 is raised and the shift initiated. When the carriage is shifted from the extreme right hand position, the lug 460 will be removed from contact with the plunger 438 and said plunger will be spring urged to its extended position. As the carriage is shifted into the extreme left hand position, the side of the nose of the plunger 438 will contact the rightmost lug 460 thereby moving the plunger and arm 367 toward the rear of the machine against the tension of spring 367a. This movement of arm 367 will remove the shoulder thereof from restraining engagement with lever 439 allowing said lever and shaft 365 to be spring urged counterclockwise to normal and thus terminate the shift. When the shift key is finally released, the plunger 438 will drop below lug 460 and arm 367 will be urged forward by its spring thus locating the shoulder thereof in normal engagement with lever 439.

*Carriage position operation control means*

The invention concerns the control of the operations performed by a single cycle clutch 464 (Figs. 2 and 9) in conjunction with the control of the engagement of the differential clutch mechanism 104. Clutch 464 is invariably engaged for a single cycle of operation upon depression of operating key 587 (Figs. 1, 4 and 9) to drive a train of mechanisms, the adjustment of which is determined by the position of the shiftable carriage. In the particular machine to which the invention has been applied, clutch 464 may also be adapted to clear the counting dials 85 and product register 13 prior to the engagement of clutch mechanism 104 whereby a program of multiplication is initiated, and the engagement of clutch 104 is also controlled by carriage position devices in conjunction with operating key 587. The program of multiplication, as fully disclosed in the aforenoted application Serial No. 8,548 (now Patent 2,531,207), may be initiated only when carriage 2 is in its leftmost position. In accordance with said disclosure, a value set on keys 18 of keyboard 10 is multiplied by a value set in multiplier storage devices 524; the product being registered on product register 13 as the storage devices are successively counted back to zero and carriage 2 being shifted toward the right at the completion of each count. The performance of the program, however, does not concern the present disclosure and it is therefore deemed only essential to describe the initiation thereof which is effected upon engagement of clutch mechanism 104.

The clearance of register 13 may also be rendered effective to transfer a value therein to the storage devices 524 so that said value may then be used as a multiplier. This operation and the mechanism through which clutch 464 is effective to perform the clearout operation are fully disclosed in the aforementioned application, Serial No. 57,943 (now Patent 2,531,208), which operations are also incidental to the operation of the control devices of the present disclosure.

The operations effected upon depression of operating key 587 as determined by the carriage position devices will now be described first considering carriage 2 to be located in its leftmost position.

Depression of key 587 will cause the invariable engagement of clutch 464 regardless of the position of carriage 2 and if the carriage is in its leftmost position shaft 591 (Figs. 2 and 9) will be rocked to operate mechanism by which the engagement of differential clutch mechanism 104 is also effected. The effective operation of the mechanism to engage clutch mechanism 104 however will be held in abeyance until the completion of the single cycle of operation of clutch 464. Clutch 464 is adapted to drive a train of mechanisms (to be described) including a device which is adjusted to be ineffectively operated if the carriage is in its leftmost position. If, however, the carriage is located out of its leftmost position, the control devices will render the operation effective to depress and hold left shift key 370 until the carriage has been shifted into its leftmost position.

Clutch 464 is adapted to be engaged for a single cycle of operation upon movement of any one of a bank of slides 477, 478 or 479, toward the left (Fig. 9). The movement of the slides, either individually or simultaneously, will effect the engagement of clutch 464 and also select the clearout operation to be performed; slides 477, 478 and 479 adjusting the mechanism to clear the counting dials, keyboard and product register respectively. The invention, however, concerns only the carriage position controlled operation performed by clutch 464 and the operation of slides 477, 479 will only be considered in connection with the engagement of clutch 464. Slides 477, 479 are moved to the left upon depression of key 587 to effect engagement of clutch 464 as follows:

Key 587 is normally held in raised position by a suitable spring and the lower end of the stem thereof is pivotally attached by a lug to a bail 619. Bail 619 is provided with rearwardly extending arms at either end and is thereat pivotally mounted on shaft 591 which is transversely located at the lower front of the machine. The left hand arm of bail 619 is provided with a depending crank portion on which the forward end of a trip arm 620 is pivotally mounted.

Arm 620 extends toward the rear and the free end thereof is supported and guided by a slot in bracket 621 which is mounted on the base plate of the machine. Upon depression of key 587, bail 619 will be rocked in clockwise direction (Fig. 9) thereby moving trip arm 620 toward the rear and into contact with an arm 624' integral with and extending to the right of a two bladed cam lever 624 which will thereby be rocked in counterclockwise direction against the tension of a suitable spring. The effective edges of the upper and lower blades of cam lever 624 are in contact with rollers on slides 477 and 479 respectively and said slides are accordingly moved toward the left when the cam lever is rocked.

The leftmost ends of slides 477, 479 are in abutment with an upstanding ear 482' of a latch 482 which is normally in engagement with a shoulder 480' of a slide 480 thereby holding said slide in its rearward position against the tension of a spring 481. Slide 480 is slidably supported at its forward end on a shaft 484 which extends across the machine and projects externally of the left and right hand side frames. The slide is attached at its rearward end to an arm 485 fixed on a shaft 486 which is rotatably mounted in the side frame. Therefore, movement of slides 477, 479 toward the left will rock latch 482 clockwise against the tension of spring 483, thereby releasing slide 480 which will be moved forwardly by its spring and rock arm 485 and shaft 486 in counterclockwise direction. The left hand ends of slides 477, 479 are each provided with a recess and when the slides are moved to active position, the forward end of slide 480 will enter said recesses and hold the slides 477, 479 in set position until the engaging end of slide 480 has been removed upon restoration of said slide to latched position.

Clearout clutch 464 is driven by a suitable gear train 464' from the electric motor and is of well-known construction in which a spring pawl on the driven member of the clutch is held out of engagement with the driving member by a detent. For this purpose a detent 487 is fixed on shaft 486 and when slide 480 is moved forwardly and shaft 486 rocked by arm 485, detent 487 will be removed from engagement with the pawl of clutch 464 thereby engaging the drive to the motor. To prevent engagement of the differential clutch 104 during the operation of clutch 464, arm 485 is provided with an extension 488 having an open end slot at its free end which when arm 485 is rocked to engage clutch 464 will engage a pin 489 on clutch lever 111 thereby holding said lever in neutral position. In order that clutch 464 will be disengaged at the completion of a single cycle of operation, detent 487 is provided with an extension 492, the free end of which is provided with a cam face 492'. When detent 487 is disengaged, the free end of extension 492 will be moved downwardly, thus bringing the cam face 492' into position to be engaged by a pin 493 mounted on the driven member of clutch 464 which moves in clockwise direction. As clutch 464 approaches its full cycle position, the pin 493 will contact cam face 492', raising extension 492 and thus moving detent 487 into position where it will engage the pawl of clutch 464 and disconnect the drive when the clutch reaches full cycle position. In the return movement of detent 487 to engaging position, shaft 486 will be rocked clockwise, moving arm 485 and slide 480 toward the rear, thereby releasing slides 477, 479. Pin 493 will pass under cam face 492', providing sufficient movement of slide 480 to bring the shoulder 480' to the ear of latch 482 which will be urged into latching position by spring 483. The movement of latch 482 to restraining position will be effective to move slides 477, 479 to normal position and provision is made to prevent interference of such movement if the cycle of operation of clutch 464 is completed before the release of key 587. To prevent such interference, trip arm 620 is cammed upwardly by the slot in bracket 621 as it is moved to its rearmost position upon depression of key 587. Thus the free end of arm 620 is raised out of engagement with arm 624', thereby releasing cam lever 624. The train of mechanism operated by clutch 464 and the device adjustable to be operated either effectively or ineffectively in conjunction with left shift key 370 comprises the following. The driven member of clutch 464 is provided with an eccentric cam 495 shown in dotted lines (Fig. 2). Cam 495 is adapted to impart a reciprocatory movement to a link 496, attached at its forward end to a crank arm 497 which is fixed on shaft 484. Thus when clutch 464 is operated, shaft 484 will be rocked clockwise (Figs. 2 and 9) during the first half of the cycle and during the second half of the cycle will be rocked back to normal. A crank 602 (Figs. 4 and 9) fixed on the rightmost end of shaft 484 has yieldable link connection 603 with a depending crank 604 which is integral with a rearwardly disposed hub of an arm 605. The hub of arm 605 is rotatably mounted and adapted for lateral displacement on a stub shaft 606 extending outwardly from the right hand side frame. The hub of arm 605 is provided with a circumferential slot which is engaged by a pin in the end of a forwardly extending arm of a rocker 597. Thus it will be seen that when rocker 597 is rocked in either direction, arm 605 will accordingly be moved either to the right or left on shaft 606.

Rocker 597 is biased in either clockwise or counterclockwise direction by a tightly wound spring 596. Spring 596 is mounted on the rear and extends downwardly from an adjustable slide 595 which is normally adjusted to the position shown in Fig. 9 and for the purposes of the present disclosure may be considered in fixed position in which rocker 597 is biased in one direction only. The lower end of spring 596 is displaced toward the front of the machine to extend through on opening in the end of an inwardly extending arm of rocker 597 and as said spring tends to assume a straightened position, rocker 597 is biased in clockwise direction (Fig. 9) thereby tending to move arm 605 into engagement with a pin 370' on the lower end of the stem of left shift key 370 (Fig. 5). The forward end of arm 605 is normally located between the pin 370' and another pin 369' on the stem of right shift key 369. When, however, the carriage is in its leftmost position, means are provided which will hold arm 605 in centralized position between and out of contact with the pins 369' and 370'. Thus, when clutch 464 is operated upon depression of key 587, shaft 484 through crank 602, link 603 and crank 604 will rock arm 605 ineffectively to a position above pins 369', 370', and back to normal without contacting said pins. The carriage control means which holds arm 605 in centralized position comprises the following:

A lever 600 (Figs. 4 and 9) pivotally mounted on the outer face of the right hand side frame is provided with a downwardly extending arm which terminates in an inwardly bent portion adjacent the inwardly extending arm of rocker 597 and thereat has slot connection with the end of spring 596 which will therefore urge said lever in clockwise direction (Fig. 9). Lever 600, however, is blocked from clockwise movement by a stop 601 which is adjusted into the path of movement of a rearwardly extending arm of said lever when the carriage is located in its leftmost position. Arm 605 will thus be held in centralized position a spring 596 will be prevented by lever 600 from moving rocker 597 to adjust said arm into engagement with pin 370'.

Stop 601 is yieldably mounted at the end of a bar 613 which is slidably mounted in suitable slots at the upper rear of the side frames of the machine and extends beyond the frames at either end. The bar is centrally located by two springs 614, one of which is shown in Fig. 9. When carriage 2 is in any position intermediate the extreme right and left, two spaced lugs of stop 601 are positioned on either side of the rearwardly extending arm of lever 600, thus allowing said lever to be rocked in either direction. However, when the carriage is in the leftmost position, the head of a screw 615 (Fig. 4) mounted on the inner face of the right hand end plate of the carriage will be brought into contact with the end of bar 613, thereby moving the bar to the left, in which position the upper lug of stop 601 will be located above the end of the arm of lever 600, to prevent said lever from clockwise rotation. The lower lug of stop 601 will be located below the arm of lever 600 when the carriage is in its rightmost position to prevent the counterclockwise movement of said lever and thereby control certain machine operations which do not concern the present disclosure. When in this adjusted position, however, it will be noted that stop 601 will permit clockwise movement (Fig. 9) of lever 600 and it is only when the carriage is in its leftmost position that such movement is prevented by said stop.

Provision is made to latch arm 605 in centralized position, regardless of the position of the carriage until operating key 587 is depressed. Such provision is not necessary to the operation of the devices of the present disclosure as arm 605 has sufficient depth to prevent it from being moved laterally above either of pins 369' or 370' when in normal position upon manual depression of either of the shift keys respectively. This arrangement is allowed by yieldable connection 603 to arm 605 which, as will be described, permits an excess movement of the driving means, thereby normally locating arm 605 in this lowered position. The inclusion of the latching means is desirable, however, so that clutch 464 may be operated to perform a clearout operation by depression of clear keys 465, 466 or 467 (Fig. 1) without arm 605 being moved into operating relationship with either of the shift keys, which operation would invariably initiate a carriage shift if the carriage were out of an end position. The means whereby the clear keys engage clutch 464 is fully disclosed in my copending application, Serial No. 8,547, and does not concern the present invention The latching means for maintaining arm 605 in centralized position, unless key 587 is depressed, comprises a lever 598 (Figs. 4 and 9) pivotally mounted intermediate its ends on the right hand side frame. The rearward end of lever 598 is provided with a recess 598' in the lower edge thereof. Lever 598 is normally held in clockwise position (Fig. 4) by a spring 599 in which position an outwardly extending arm of rocker 597 is positioned within said recess, thereby preventing said rocker and thus said arm 605 from being moved from centralized position. Bail 619 is provided on its rightmost arm with a pin which overlies the forward end of lever 598. Therefore, when bail 619 is rocked by key 587, lever 598 will be rocked, thereby freeing rocker 597 from restraint by recess 598'. As will be hereinafter described, when rocker 597 is moved from its central position, the outwardly extending arm thereof will be moved to one side of recess 598' and upon release of key 587, the lower edge of lever 598 will rest upon said arm until the rocker is restored to centralized position, thereby permitting the reengagement of recess 598'.

Upon completion of the above described cycle of operation of clutch 464, the differential clutch mechanism 104 will be engaged. As heretofore noted, when the carriage is in its leftmost position, the engagement will be effected in response to the depression of key 587. The operation of the mechanism, however, to effect the engagement will be held in abeyance until the completion of the operation of clutch 464. The mechanism which is operated to effect the engagement of differential clutch 104 comprises the following:

A pair of slides 658 and 659 (Figs. 2 and 10) are adapted to move clutch lever 111 either to its plus or minus position respectively. The general configuration of the slides is most clearly shown in the exploded perspective (Fig. 10). From an inspection of Fig. 2, it will be seen that slide 659 is mounted to the rear and adjacent slide 658. The forward portions of the slides are in slidable contact and slide 659 is bent inwardly and extends toward the rear of the machine in spaced relationship to slide 658. The slides are provided with suitable slots at their forward ends, whereby they are mounted for longitudinal movement on shaft 646 which extends outwardly from the left hand side frame, and toward the rear the slides are further supported by a stub shaft 660 which extends through a pair of similar slots. At their rear, the slides 658, 659 are provided with substantially square openings and pin 489 mounted on clutch lever 111 extends outwardly through said openings. It will be noted that when the parts are in their normal positions pin 489 is centrally located between the front and rear edges which define the openings and that the distance is sufficient to allow operation of clutch lever 111 without interference from the slides 658, 659.

From the foregoing, it will be seen that if link 658 is moved toward the rear, an edge of the opening therein will contact pin 489 and thus move clutch lever 111 clockwise to its plus position. Also, if slide 659 is moved forwardly, said slide will in like manner operate to move clutch lever 111 counterclockwise to its minus position. Accordingly, provision is made for the control and operation of the slides as follows:

Slide 658 is provided at its forward end, and to the right of the slot therein, with an outwardly extending lug 658'. Slide 659 is provided with a similar lug 659' adjacent its forward end but to the left of the slot therein. From an inspection of Fig. 2 it will be seen that lug 659' extends outwardly below slide 658 and that the lugs are spaced equidistantly on either side of shaft 646.

A control plate 661 is pivotally mounted on shaft 646. Plate 661 is positioned between the lugs 658' and 659' and is provided with right and left wings. The right wing of plate 661 is adapted for blocking engagement with lug 658' and the left wing for engagement with lug 659'. However, when the parts are in their normal position the lugs are a slight distance to either side of plate 661, thus allowing said plate to be rocked in either direction.

Pivotally mounted at its lower end on shaft 646 and to the rear of slide 659 is the lower link 662 of a toggle including an upper link 663. The upper end of toggle link 663 is pivoted to the forward end of an arm of a lever 664 which is fulcrumed on a stud extending outwardly from the side frame. Lever 664 is biased in clockwise direction by a spring 665; however, when toggle 662—663 is in set position, as shown in Fig. 2, lever 664 is thereby held in counterclockwise position against the tension of said spring 665.

The rearwardly extending arm of lever 664 is provided with a depending link 666 on the lower end of which is attached a pair of diverging links 667 and 668. Link 667 extends forwardly and has pivotal connection with slide 658 and link 668 extends rearwardly and has pivotal connection with slide 659. Thus it will be seen that when lever 664 is rocked clockwise, link 666 will be raised. Accordingly, link 667 will tend to move slide 658 toward the rear and link 668 will tend to move slide 659 toward the front of the machine. However, as either the right or left wing of control plate 661 will be in blocking position with lugs 658' or 659' respectively, movement is accorded only one of the slides 658 or 659.

From the foregoing, it will be seen that when toggle 662—663 is broken, lever 664 will be rocked clockwise by spring 665, thus raising link 666. If control plate 661 is in counterclockwise position as shown in Fig. 2, the left wing thereof will be in blocking position with lug 659', thus preventing slide 659 from being moved toward the front of the machine. However, the right wing of the control plate will be raised above lug 658', thus allowing slide 658 to be moved toward the rear of the machine and into contact with pin 489 of clutch lever 111 to move said lever into plus position. It will be noted that control plate 661 is normally in counterclockwise position and, throughout a program of plus multiplication initiated upon depression of key 587, is so held to control the engagement of differential clutch 104 for plus operation to effect plus registration or alternatively carriage shift toward the right. A program of minus multiplication initiated upon depression of key 589 provides for the adjustment of control plate 661 to its minus and alternatively plus positions to effect minus registration and right carriage shift respectively. The control of the position of control plate 661, however, in a program of multiplication and the determination of registration or alternatively carriage shift upon engagement of differential clutch 104 does not concern the present invention and is fully disclosed in the aforenoted copending application, Serial No. 8,548.

Upon depression of operating key 587, toggle 662—663 will be broken to effect the engagement of differential clutch 104 and the mechanisms to effect the operation are constructed and operated in accordance with the following:

A lug 619' extending from the left of bail 619, overlies a pin 622' in a forwardly extending arm of a bail 622, as indicated by the dot-dash lines in the partially exploded perspective (Fig. 9). Bail 622 is held in normal counterclockwise position by a suitable spring attached at the end of pin 622'. A plate 774 (Figs. 9 and 11) is rotatably mounted on shaft 591 and a shoulder on the lower edge of said plate is engaged by the rearward edge of bail 622. An upstanding crank 775 is fixed on shaft 591 and is provided at its end with a pin 776 extending to the right thereof. Yieldable spring coupling 777 attached to pin 776 and plate 774 normally holds crank 775 and plate 774 in fixed relationship with the upper rear edge of said plate in contact with pin 776. Plate 774 extends forwardly and is thereat provided with a pin 774' to which is attached a suitable spring, which normally holds plate 774, crank 775 and shaft 591 as a unit in counterclockwise position with the shoulder of said plate in contact with bail 622. A minus multiplier key 589 and a second multiplier key 589 which initiate programs of multiplication exclusive of the preliminary clearing operation are provided in the machine and have pin and slot connections with plate 774 and bail 622 respectively. The operation of these keys, however, bears no relationship to the present invention and is fully disclosed in the aforenoted application, Serial No. 8,548 (now Patent 2,531,207).

As will presently appear, the yieldable coupling performs no active function when the carriage is in its leftmost position and its essential operation is effected upon depression of key 587 when the carriage is displaced therefrom. Upon depression of key 587 to rock bail 619, lug 619' by engagement with pin 622' will accordingly rock bail 622. Bail 622 by engagement with the shoulder of plate 774 will also rock said plate and the spring coupling 777 will be effective to likewise rock crank 775 and shaft 591 in the same direction. Bail 622 is provided with an arm 689 (Fig. 2) at its leftmost end and when said bail is rocked, arm 689 is moved into engagement with a pin 661' on the right wing of control plate 661 thereby maintaining said plate in plus position throughout the calculation.

Shaft 591 is provided with an upstanding arm 677 (Fig. 2) fixed on its leftmost end and adapted for engagement with a depending arm of a plate 675 when shaft 591 is rocked. Plate 675 is pivotally mounted at its upper end on a shaft 676 extending outwardly from the framing of the machine. A hook member 680 is pivotally mounted on plate 675 below its pivot on shaft 676, and a spring attached at the pivotal point of said hook to plate 675 biases said hook and plate as a unit in a clockwise direction. Hook 680 extends upwardly and the effective end thereof is normally positioned above and is adapted for contact with an arm 663' integral with and extending upwardly to the right of toggle link 663. Therefore, when shaft 591 is rocked, arm 677 will move plate 675 in counterclockwise direction, thereby moving hook 680 into contact with arm 663' and breaking toggle 662—663.

It will be noted that hook 680 is a distance above arm 663' and therefore clutch 464 will be engaged before toggle 662—663 is broken. Clutch lever 111 will therefore be held in neutral position by arm 488 until the completion of the cycle of operation of clutch 464, at which time slide 658 which is moved to the rear and into contact with pin 489 will be effective to move cluch lever 111 to engage differential clutch 104.

Toggle link 662 is provided with a pin 681 on a rearward extension and when toggle 662—663 is broken, said pin is adapted to engage an arm 680' of hook 680, thereby moving said hook in clockwise direction out of the path of movement of arm 663' so that toggle 662—663 may be reset. Toggle 662—663 is reset by a link 682 which is attached at its forward end to the lower link 662 of said toggle by pin 681. Link 682 extends toward the rear of the machine as indicated by the dot-dash lines (Fig. 2) and at its rearward end has slot and pin mounting on a crank 683. When toggle 662—663 is broken, the slot and pin mounting permits rearward movement of link 682. During the first operating cycle of the machine which is initiated upon enagagement of differential clutch 104, link 682 will be driven forwardly, thereby resetting toggle 662—663. Upon completion of the calculation, plate 675 is moved clockwise to normal, thereby moving arm 680' into engagement with a fixed pin 670 to rock hook 680 back into effective position above arm 663'. These operations, however, are incidental to the present invention and are fully disclosed in the aforenoted application, Serial No. 8,548 (now Patent 2,531,207).

A double latch system comprising a plate 778 (Fig. 9) fixed on shaft 125 and a latch lever 779 are provided to prevent rocking of shaft 591 upon depression of key 587 when the carriage is displaced from its leftmost position. The latch system is adapted to operate in conjunction with a slide 593, the forward end of which is attached to a depending crank 592 fixed on shaft 591. Slide 593 is provided with pin and slot mounting at its rear and is thereat provided with a lug 593a which is adapted for entrance into a slot in plate 778. Slide 593 is further provided with an upstanding arm 593b which is engageable by latch 779 to prevent rearward movement of said slide.

When carriage 2 is in its leftmost position, a lug 547 (Figs. 1, 4 and 9) on the carriage will engage the rearward end of a lever 548 thereby rocking said lever in counterclockwise direction (Fig. 9) against the tension of a spring 548'. Lever 548 has slot connection at its forward end with the upper free end of an arm 421. Arm 421 is loosely pivoted at its lower end to perform operations not involved in the present disclosure. Furthermore, the pivotal mounting will allow the upper end of arm 421 a degree of lateral movement which is effected when lever 548 is rocked. Latch 779 is pivotally mounted on a bracket on the inner face of the right hand side frame and is attached at its rearward end to arm 421. Therefore, when lever 548 is rocked, the upper end of arm 421 will be displaced toward the right and latch 779 rocked in clockwise direction (Fig. 9) out of engagement with arm 593b of slide 593.

Furthermore, when the machine is in normalized condition, the slot in plate 778 on shaft 125 will be in alignment with lug 593a of slide 593. Therefore, when shaft 591 is rocked upon depression of key 587, crank 592 will move slide 593 toward the rear of the machine; such movement being allowed by the entrance of lug 593a into the slot of plate 778 and removal of latch 779 from engagement with arm 593b.

With carriage 2 displaced from its leftmost position, the lug 547 thereon will be out of engagement with lever 548 and spring 548' will be free to move said lever in clockwise direction, thereby moving the upper end of arm 421 toward the left and latch 779 counterclockwise into engagement with arm 593b of slide 593, thus preventing said slide from movement toward the rear. Therefore, upon depression of key 587, slide 593 will prevent shaft 591 from being rocked to break toggle 662—663. Bail 619, bail 622 and plate 774 will, however, be rocked on shaft 591; such movement being allowed by yieldable spring coupling 777 which will be tensioned in the operation. Therefore, clutch 464 will be engaged in the manner heretofore described and a transfer operation may be effected upon clearance of register 13 in accordance with the aforenoted application, Serial No. 57,943 (now Patent 2,531,208). Furthermore, lever 598 (Fig. 4) will be rocked to remove recess 598' from engagement with the arm of rocker 597.

Upon release of rocker 597 by lever 598, spring 596 (Fig. 9) will be free to move said rocker in clockwise direction as lever 600 is unrestrained from clockwise movement by stop 601 when the carriage is out of the leftmost position. Arm 605 will therefore be moved laterally toward the left to bring the leftmost face thereof into contact with the end of pin 370' (Fig. 5). Upon operation of clutch 464, arm 605 will first be raised above pin 370', whereat it will be allowed further movement toward the left until restrained by the stem of left shift key 370. Arm 605 will then be rocked downwardly into engagement with the upper side of pin 370' and in the completion of its downward travel will depress left shift key 370; the yieldable connection 603 allowing a slight overdrive to insure the full depression of said key. Left shift key 370 will be held depressed by arm 605 and the program of operations will be terminated if operating key 587 has been released prior to the completion of the shift of the carriage into the leftmost position as follows:

When carriage 2 is shifted into the leftmost position the shift will be terminated as described in connection with the carriage shifting mechanism when considering the shift key as held depressed. Thus arm 24 (Fig. 2) will be carried against fixed stop 29 and arm 429 (Fig. 4) rocked in counterclockwise direction. Rocker 597 is provided with an open end cam slot extending to and flaring outwardly at the rear. As arm 429 is rocked, the extension 429' will engage said cam slot thereby moving rocker 597 counterclockwise (Fig. 9) back to its central position. Rocker 597 will therefore move arm 605 to the right out of engagement with pin 370' thereby releasing left shift key 370 and permitting the tensioned yieldable connection 603 to move said arm downwardly to its normal position. Furthermore, the outwardly extending arm of rocker 597 which displaced to one side of recess 598' acts to hold lever 598 in rocked position will be moved to position to permit restoration of said lever, whereby recess 598' will engage said arm to hold rocker 597 in centralized position.

In addition to the above normalizing operations, provision is made to readjust lever 600 and stop 601 into blocking relationship as follows: When the carriage is moved into its leftmost position, the rearwardly extending arm of lever 600 will be in raised position and the upper lug of stop 601 will therefore be moved laterally into engagement with said arm and not allowed to be moved above said arm into blocking position. The yieldable mounting, however, of stop 601 on bar 613 will permit said bar to be moved toward the left thereby displacing said stop from its normal position. Therefore, when rocker 597 is centralized by arm 429', lever 600 will be rocked in counterclockwise direction (Fig. 9), thus lowering its rearwardly extending arm and permitting the upper lug of stop 601 to be located in blocking position as said stop will be moved to its normal position by its yieldable mounting.

If key 587 is held depressed until the carriage is shifted into its leftmost position, the energized spring coupling 777 will be effective to rock shaft 591 to engage differential clutch 104 as follows: Latch 779 will release slide 593 as heretofore described. Slide 593 will not, however, be immediately free to be moved toward the rear as shift key 370 and minus key 121 are still held in depressed position, thus holding shaft 125 in rocked position. The slot in plate 778 will therefore be out of registration with lug 593a of slide 593 and, consequently, said slide will be locked from rearward movement. This provision is necessary as the normalizing operations following the conclusion of the carriage shift must be effected before the engagement of differential clutch 104.

When left shift key 370 is released and said key and consequently minus key 121 are restored to their raised positions, shaft 125 will be rocked to its normal position. Therefore, the slot in plate 778 will be brought into alignment with lug 593a of slide 593, thereby releasing said slide for movement toward the rear. Spring coupling 777 will now be effective to rock crank 592 and shaft 591 in clockwise direction (Fig. 9) and thereby effect engagement of differential clutch 104 to initiate a program of multiplication.

Although I have shown and described the carriage position control devices in connection with certain specific programs of operation, it will be apparent that the devices are equally applicable to the control of other clutch driven operations and to machines in which the shifting and registering mechanisms are driven by individual clutches and wherein it is desirable to locate a shiftable carriage in a given position prior to the initiation of a particular program of operations.

I claim:

1. Operation control means for a motor driven calculating machine having a shiftable register carriage, mechanism for denominationally shifting said carriage including a control member movable to initiate the shifting operation, means operable upon movement of said carriage into a given position to terminate operation of said carriage shifting mechanism, and a clutch mechanism; said control means comprising a clutch control train including an operating member for moving said train to initiate operation of said clutch mechanism, latching means for restraining said clutch control train from said initiating movement, latch control means operable upon movement of said carriage into or out of said shift terminating position to release or to set said latching means respectively, drive means operable upon movement of said operating member, a device adjustable into operating relationship with said shift control member and thereupon operable by said drive means to move said shift control member to shift initiating position; means operable upon movement of said carriage into or out of said shift terminating position to adjust said device out of or into operating relationship respectively with said shift control member, and a yieldable spring coupling in said clutch control train for permitting movement of said operating member when said clutch control train is restrained.

2. Operation control means for a motor calculating machine according to claim 1 characterized by the provision of latching means for holding the adjustable device out of engagement with the shift control member; said latching means being movable upon movement of the operating member to release said adjustable device and thereby permit adjustment of the device into engagement with the shift control member.

3. Operation control means for a motor driven calculating machine according to claim 1 wherein the shift control member upon movement to shift initiating position is effective to maintain operation of the shifting mechanism and wherein the adjustable device upon adjustment into operating relationship with said shift control member is further operable upon operation to hold said shift control member in shift initiating position.

4. Operation control means for a motor driven calculating machine according to claim 3 wherein the adjusting means for the device includes an element deriving power from said shift terminating means and operable to effect the adjustment of said device out of operating relationship with the shift control member.

5. Operation control means for a motor driven calculating machine having a shiftable register carriage, mechanism for denominationally shifting said carriage including a control member movable to initiate the shifting operation, means operable upon movement of said carriage into a given position to terminate operation of said carriage shifting mechanism, and a clutch mechanism; said control means comprising a clutch control train including an operating member for moving said train to initiate operation of said clutch mechanism, latching means for restraining said clutch control train from said initiating movement, latch control means operable upon movement of said carriage into or out of said shift terminating position to release or to set said latching means respectively, drive means operable upon movement of said operating member, a device adjustable into operating relationship with said shift control member and thereupon operable by said drive means to move said shift control member to shift initiating position, power means operable to adjust said device into operating relationship with said shift control member, adjustable disabling means for said power means, a contact member operable upon movement of said carriage into or out of said shift terminating position to render effective or ineffective said disabling means respectively, a yieldable spring coupling in said clutch control train for permitting movement of said operating member when said clutch control train is restrained and drive means operable upon movement of said carriage into said shift terminating position to adjust said device out of operating relationship with said shift control member.

6. Operation control means for a motor driven calculating machine according to claim 5 wherein the carraige shift terminating means includes the drive means for adjusting the device out of operating relationship with the shift control member.

7. Operation control means for a motor driven calculating machine having a shiftable register carriage, mechanism for denominationally shifting said carriage and a clutch mechanism; said control means comprising a driving train for said shifting mechanism including an element adjustable into or out of driven relationship with said clutch mechanism, a clutch control train including a first clutch control member and an operating member for moving said clutch control member to initiate operation of said clutch mechanism, a second clutch control member movable to initiate operation of said clutch mechanism and to adjust said element of said drive train into driven relationship with said clutch mechanism, drive means operable upon movement of said operating member, a device adjustable into engagement with said second clutch control member and thereupon operable by said drive means to move said clutch control member to initiating and adjusting position, means responsive to the movement of said carriage out of a given position to adjust said device into engagement with said second clutch control member, means responsive to the movement of said carriage into said given position to adjust said device out of engagement with said second clutch control member and said element of said drive train out of driven relationship with said clutch mechanism, latching means settable in response to movement of said carriage out of said given position to restrain said first clutch control member and movable to release said member in response to movement of said carriage into said given position, and a yieldable spring coupling device in said clutch control train for permitting movement of said operating member when said first clutch control member is restrained and to thereby energize said spring device; said device thereupon being effective upon release of said first clutch control member to move said member to initiate operation of said clutch mechanism.

8. Operation control means for a motor driven calculating machine having a register carriage, mechanism for denominationally shifting said carriage, registering mechanism and a clutch mechanism alternatively engageable to effect operation of said registering mechanism and said carriage shift mechanism respectively; said control means comprising, a clutch control train including a clutch control member and an operating member for moving said clutch control member to engage said clutch mechanism to effect operation of said registering mechanism, latching means for restraining said clutch control member from said clutch engaging movement, latch control means operable upon movement of said carriage into or out of a given position to release or to set said latching means respectively, a yieldable spring coupling in said clutch control train for permitting movement of said operating member when said clutch control member is restrained and to thereby energize said spring device; said device thereupon being effective upon release of said clutch control member to move said member to effect engagement of said clutch mechanism, a device adjustable from ineffective to effective position in response to movement of said carriage out of said given position; said device thereupon being operable in response to the movement of said operating member to engage said clutch mechanism to effect operation of said shifting mechanism, means operable in response to movement of said carriage into said given position to adjust said device to ineffective position and carriage shift terminating means operable in response to the movement of said carriage into said given position.

9. Operation control means for a motor driven calculating machine having a denominationally shiftable register carriage, a clutch mechanism, and carriage shifting mechanism including driving means adjustable into or out of engagement with said clutch mechanism; said control means comprising a first means operable to engage said clutch mechanism, a second means operable to engage said clutch mechanism and to adjust said carriage shift driving means into engagement with said clutch mechanism, an operating member movable to effect operation of the two said clutch engaging means alternatively, control means adjustable in response to the movement of said carriage into or out of a given position to determine the operation of said first or second named clutch engaging means respectively in response to the movement of said operating member, carriage shift terminating means operable to disengage said clutch mechanism in response to the movement of said carriage into said given position including drive means operable to adjust said carriage shift driving means out of engagement with said clutch mechanism.

10. Operation control means for a motor driven calculating machine according to claim 9 wherein the clutch mechanism is engageable for operation in one and the opposite direction, and wherein the first named clutch engaging means is operable to engage said clutch mechanism for operation in said one direction and the second named clutch engaging means is operable to engage said clutch mechanism for operation in said opposite direction.

11. Operation control means for a motor driven calculating machine having a shiftable register carriage, mechanism for denominationally shifting said carriage including a control member movable to initiate the shifting operation, means operable upon movement of said carriage into a given position to terminate operation of said carriage shifting mechanism, and a clutch mechanism; said control means comprising a clutch control train including an operating member for moving said train to initiate operation of said clutch mechanism, latching means for restraining said clutch control train from said initiating movement, latch control means operable upon movement of said carriage into or out of said shift terminating position to release or to set said latching means respectively, drive means operable upon movement of said operating member, a device adjustable into engagement with said shift control member and thereupon operable by said drive means to move said shift control member to shift initiating position, spring means for biasing said device for engagement with said shift control member, drive means operable upon movement of said carriage into said shift terminating position to adjust said device out of engagement with said shift control member, a blocking member adjustable to restrain or release said spring biased device, a contact member operable upon movement into or out of said shift terminating position to effect the restraining or releasing adjustment respectively of said blocking member and a yieldable spring coupling in said clutch control train for permitting movement of said operating member when said clutch control train is restrained.

12. Operation control means for a motor driven calculating machine according to claim 11 characterized by the provision of latching means for holding the adjustable device out of engagement with the shift control member; said latching means being movable upon movement of the operating member to release the adjustable device.

HERMAN GANG.

REFERENCES CITED

The following references are of record in the file of this patent:

UNITED STATES PATENTS

| Number | Name | Date |
| --- | --- | --- |
| 2,294,948 | Avery | Sept. 8, 1942 |
| 2,329,649 | Pinyan | Sept. 14, 1943 |
| 2,365,324 | Avery | Dec. 19, 1944 |
| 2,377,767 | Dustin et al. | June 5, 1945 |
| 2,419,760 | Britten, Jr. | Apr. 29, 1947 |